United States Patent [19]

Nakano et al.

[11] Patent Number: 4,572,963

[45] Date of Patent: Feb. 25, 1986

[54] APPARATUS FOR CONTROLLING A PLURALITY OF ELECTRICAL DEVICES

[75] Inventors: Osamu Nakano; Toshikazu Ina, both of Aichi; Hisasi Kawai, Toyohashi, all of Japan

[73] Assignee: Nippon Soken, Inc., Nishio, Japan

[21] Appl. No.: 610,804

[22] Filed: May 16, 1984

[30] Foreign Application Priority Data

May 30, 1983 [JP] Japan .................................. 58-96538

[51] Int. Cl.$^4$ ............................................. H02J 3/00
[52] U.S. Cl. ..................... 307/10 R; 307/38; 307/41; 307/115; 307/141; 340/52 R; 340/825.57
[58] Field of Search .................. 307/10 R, 38, 39, 41, 307/113, 114, 115, 116, 140, 141; 340/825.19, 52 R, 825.57; 180/315, 326, 329, 330; 361/168.1, 186; 312/568

[56] References Cited

U.S. PATENT DOCUMENTS 3,876,950  4/1975  O'Connor ..................... 361/168.1 X
4,232,231  11/1980  Reed ................................. 307/10 R
4,264,849  4/1981  Fleischer et al. ................... 318/568
4,267,494  5/1981  Matsuoka et al. ............ 307/10 R X
4,503,528  3/1985  Nojiri .......................... 340/825.19 X

FOREIGN PATENT DOCUMENTS

WO83/00780  3/1983  PCT Int'l Appl. ............ 340/825.19

OTHER PUBLICATIONS

"Patient Breath Pulse Control System for Operating Various Electrical Devices" by Sapp, Western Electric Tech. Digest No. 54, 4–1979.

Primary Examiner—Harry E. Moose, Jr.
Assistant Examiner—Derek S. Jennings
Attorney, Agent, or Firm—Cushman, Darby & Cushman

[57] ABSTRACT

A plurality of electrical devices are controlled by a single operation switch. A transfer switch selectively connects the operation switch with one of the electrical devices. When a push button switch is actuated, the connection of the transfer switch is controlled so as to connect the operation switch with another of the electrical devices for a predetermined period of time.

17 Claims, 5 Drawing Figures

APPARATUS FOR CONTROLLING A PLURALITY OF ELECTRICAL DEVICES

BACKGROUND OF THE INVENTION

1. Field of the Invention

The present invention relates to an apparatus for selectively controlling a plurality of electrical devices through an operation switch.

2. Description of the Prior Art

In conventional systems, in general, any electrical device which can be adjusted by an operator is controlled by an exclusive-use operation switch. For example, electrical devices of an automobile, which devices can be adjusted by a driver, are controlled by corresponding operation switches. However, where the number of such electrical devices is increased, it may be difficult to provide all the corresponding operation switches, because of a lack of space. Particularly, there is limited space in the automobile for providing a large number of operation switches, and recent developments in car electronics have greatly increased the above problem of providing sufficient operation switches for the control of the increased number of electrical devices to be adjusted by the driver.

SUMMARY OF THE INVENTION

It is, therefore, an object of the present invention to provide an apparatus for controlling a plurality of electrical devices, which apparatus would not need a large space for the installation thereof.

According to the present invention the above object is achieved by an apparatus for controlling a plurality of electrical devices comprising: an operation means for controlling the electrical devices; a switching means for selectively connecting the operation means with one of the electrical devices; means for instructing the connection of the switching means; and means for controlling the connection of the switching means to connect the operation means with another of the electrical devices for a predetermined period of time when the above instructions are given.

Since a plurality of electrical devices can be controlled by a single operation means, a large space will not be needed for the installation of the operation means. Furthermore, as the operation means is connected with the other of the electrical devices on a time sharing basis, the operation of a plurality of the electrical devices is simplified.

DESCRIPTION OF THE PREFERRED EMBODIMENTS

Figure 1:
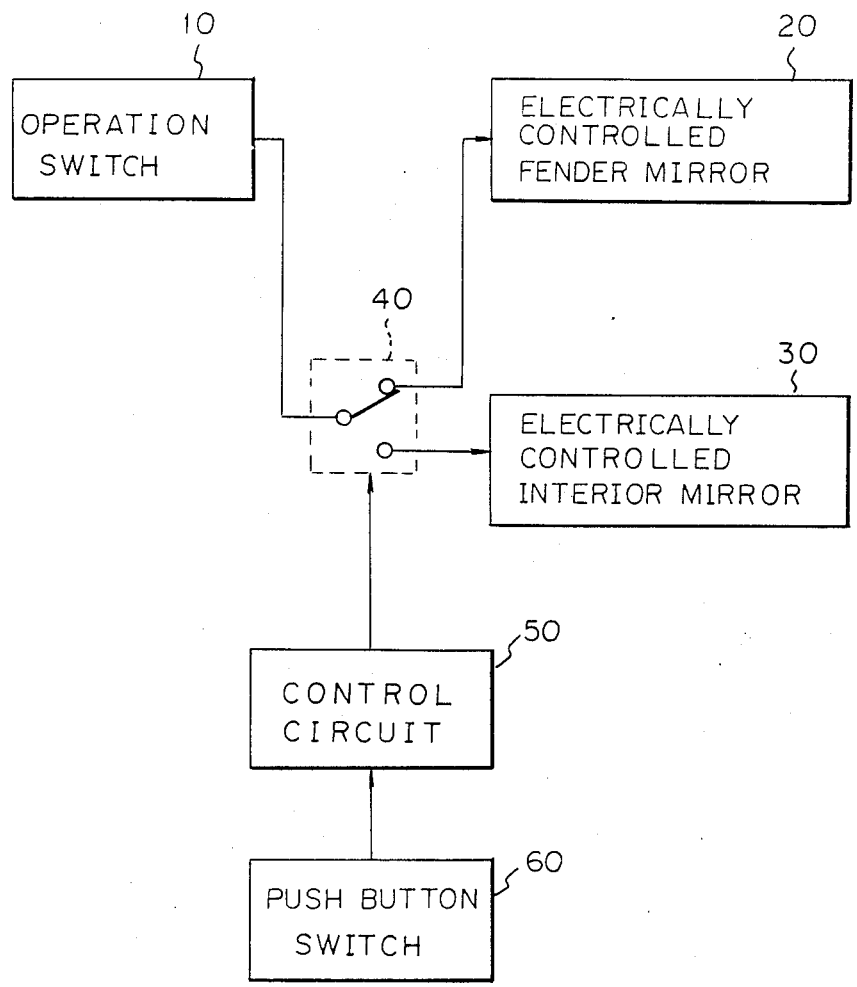
FIG. 1 is a block diagram of a first embodiment according to the present invention.

FIG. 1 illustrates a first embodiment of the present invention. In FIG. 1, reference numeral 10 denotes an operation switch fitted in the interior of an automobile, 20 an electrically-controlled exterior rear view mirror mounted on a fender of the automobile (electrically-controlled fender mirror), and 30 an electrically-controlled interior rear view mirror mounted in the interior of the automobile (electrically-controlled interior mirror). The operation switch 10 for controlling an actuator of the electrically-controlled fender mirror 20 and an actuator of the electrically-controlled interior mirror 30 is connected to a transfer switch 40. This transfer switch 40 normally connects the operation switch 10 with the electrically-controlled fender mirror 20. When energized, the transfer switch 40 transfers an electrical contact element 42 to connect the operation switch 10 with the electrically-controlled interior mirror 30.

A control circuit 50 is connected to the transfer switch 40 and produces a signal having a predetermined pulse width when a momentary-contact type push button switch 60 with normal contacts is actuated. The signal from the control circuit 50 is applied to and energizes the transfer switch 40.

Figure 2:
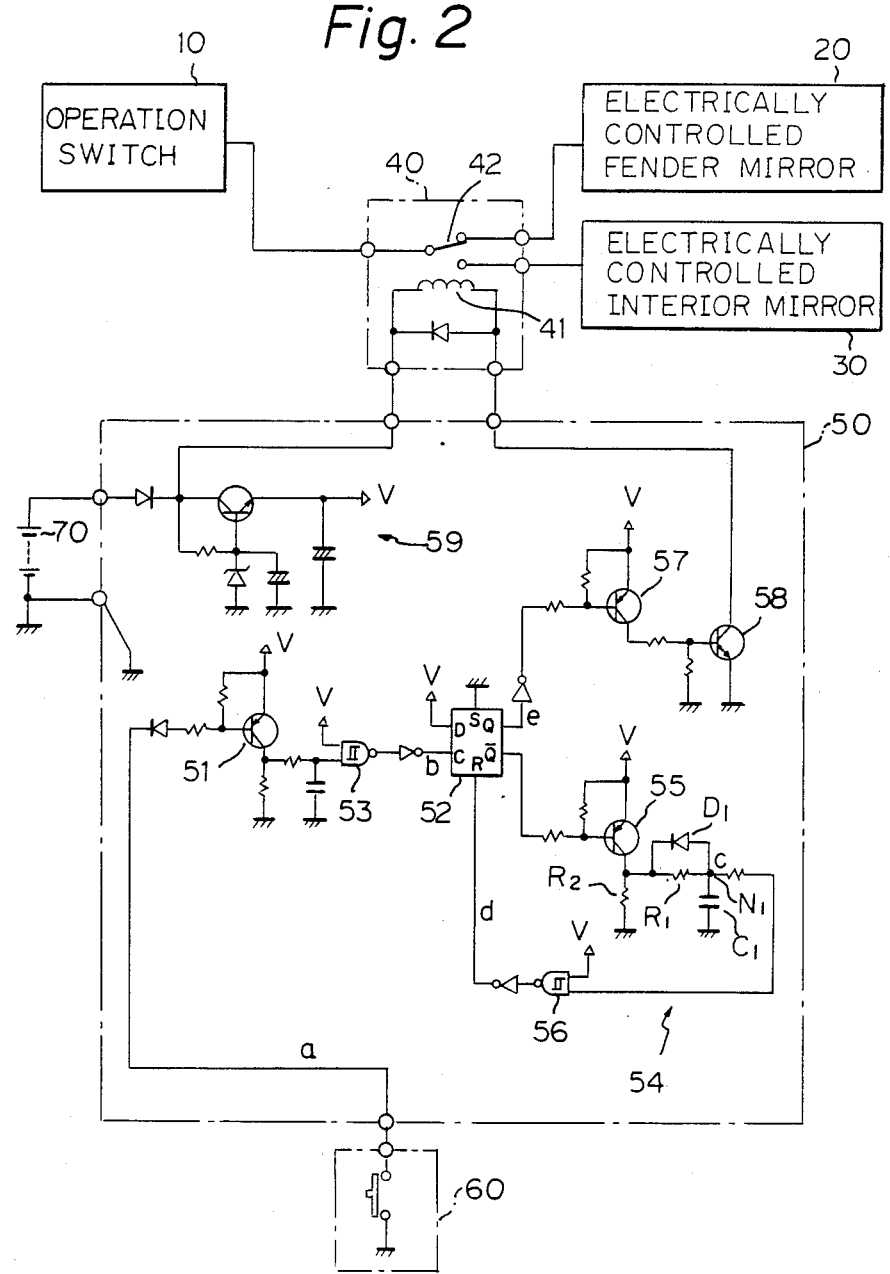
FIG. 2 is a detailed circuit wiring diagram of the embodiment of FIG. 1.

FIG. 2 illustrates a detailed circuit construction of the control circuit 50. The push button switch 60 is connected to a transistor 51 in the control circuit 50. The collector of the transistor 51 is connected to the clock terminal of a D type flip-flop 52 via a Schmitt trigger circuit 53 and an inverter. The $\overline{Q}$ output terminal and reset terminal of the flip-flop 52 are connected to a timer circuit 54. The timer circuit 54 has a transistor 55 switched by the $\overline{Q}$ output of the flip-flop 52, a charge-discharge capacitor $C_1$, a charge resistor $R_1$, a discharge resistor $R_2$, a diode $D_1$, and a Schmitt trigger circuit 56 whose output is connected to the reset terminal of the flip-flop 52. The Q output terminal of the flip-flop 52 is connected to transistors 57 and 58 via an inverter. The transistor 58 is connected in series between the ground and the positive terminal of a battery 70 of the automobile via an exciting coil 41 of the transfer switch 40. The battery 70 is connected to a power supply circuit 59 for supplying a regulated constant voltage V to each component in the control circuit 50.

Hereinafter, the operation of the first embodiment of FIGS. 1 and 2 will be explained with reference to the wave-form diagram of FIG. 3.

Normally, the transfer contact 42 of the transfer switch 40 is switched to connect the operation switch 10 with the actuator of the electrically-controlled fender mirror 20. Therefore, the electrically-controlled fender mirror 20 can be controlled by operating the operation switch 10.

Figure 3:
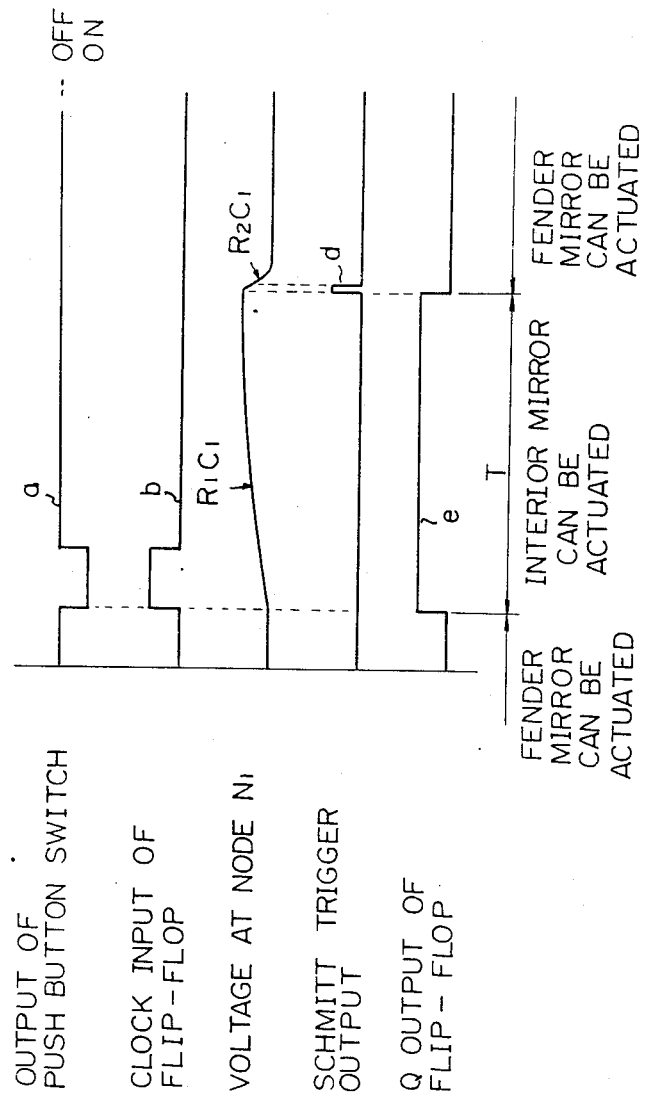
FIG. 3 is a wave-form diagram illustrating the operation of the circuitry of FIG. 2.

When the push button switch 60 is depressed, the output a of the push button switch 60 is lowered, as shown in FIG. 3, causing the transistor 51 to turn ON. Thus, the input b of the clock terminal of the rising-edge triggered flip-flop 52 changes from a low level to a high level, as shown in FIG. 3, causing the flip-flop 52 to be set. While the flip-flop 52 is set the transistor 55 is conductive, therefore, the voltage c at a node $N_1$, which is the junction of capacitor $C_1$ and the resistor $R_1$, gradually rises, as shown in FIG. 3. The voltage increasing speed depends upon a time constant $R_1C_1$, which is determined by the capacitance of the capacitor $C_1$ and the resistance of the resistor $R_1$. When the voltage c at the node $N_1$ exceeds an upper threshold voltage of the Schmitt trigger circuit 56, the output d thereof changes from a low level to a high level, as shown in FIG. 3, causing the flip-flop 52 to be reset. As a result, the Q output e of the flip-flop 52 is maintained at a high level for a time period T, which is determined by the time constant $R_1C_1$ after the push button switch 60 is actuated, as shown in FIG. 3. When the flip-flop 52 is reset, the capacitor $C_1$ is discharged via the diode $D_1$ and the resistor $R_2$. When the voltage c at the node $N_1$ drops below a lower threshold voltage of the Schmitt trigger circuit 56, the output d inverts from a high level to a low level. The duration of the high level of the output d depends upon a time constant $R_2C_1$, which is determined by the capacitance of the capacitor $C_1$ and the resistance of the resistor $R_1$.

During the set period T of the flip-flop 52, both of the transistors 57 and 58 are conductive. Thus, the exciting coil 41 of the transfer switch 40 is energized, causing the operation switch 10 to connect with the actuator of the electrically-controlled interior mirror 20 during this time period T. As a result, the electric-control interior mirror 20 can be controlled by operating the operation switch 10 for the time period T. When the time period T after the actuation of the push button switch 60 has elapsed, the flip-flop 52 is reset and the transfer contact 42 of the transfer switch 40 returns to connect the operation switch 10 with the actuator of the electrically-controlled fender mirror 30. That is, the operation of the operation switch 10 is automatically returned from the electrically-controlled interior mirror 30 to the electrically-controlled fender mirror 20 without actuating the push button switch 60. The time period T can be freely varied by changing the time constant $R_1C_1$. In this embodiment, the time period T is determined as approximately 25 seconds.

The above-mentioned control operation is not limited to the electrically-controlled fender mirror and interior mirror. For example, an electrically-controlled fender mirror and a power seat can be controlled in the same manner, or alternatively, an electrically-controlled interior mirror and a power seat can be controlled. Furthermore, other electrical devices can be controlled instead of the above fender mirror and interior mirror.

Figure 4:
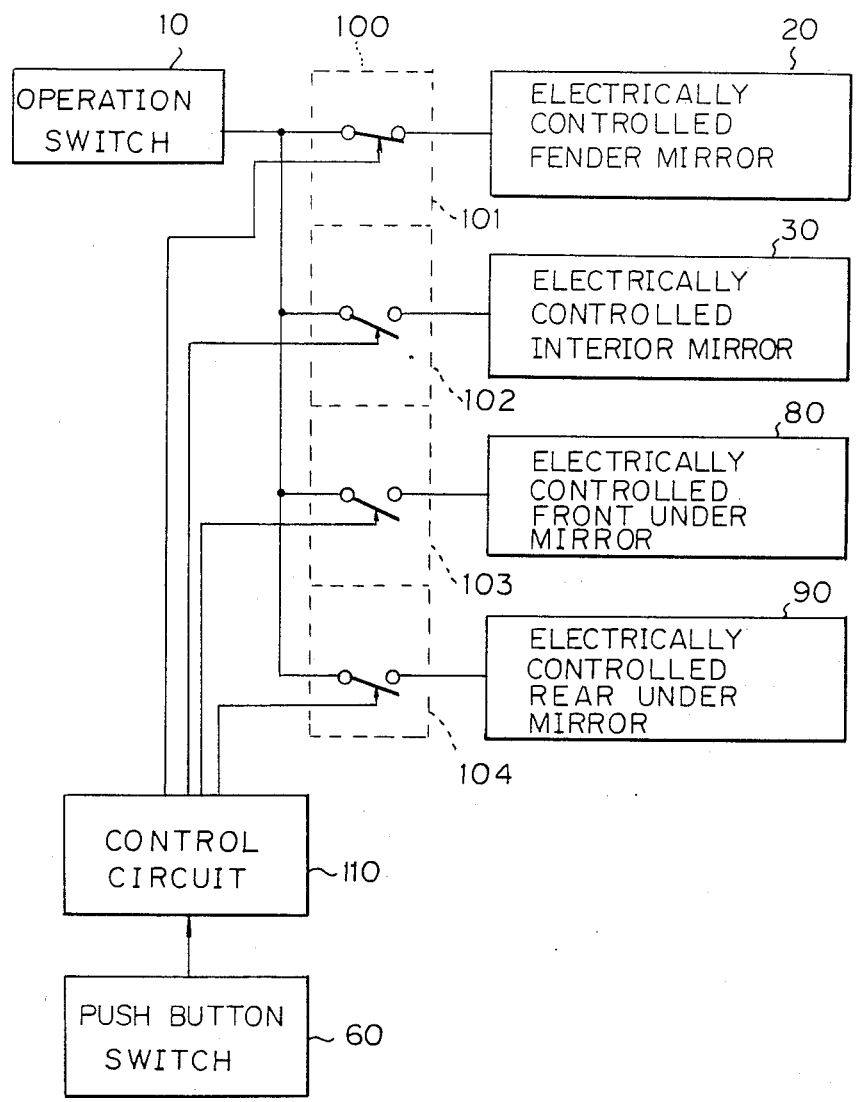
FIG. 4 is a block diagram of a second embodiment according to the present invention.

FIG. 4 illustrates a second embodiment of the present invention.

In this second embodiment, the operation switch 10 can control four electrical devices.

In the second embodiment shown in FIG. 4, the operation switch 10, the electrically-controlled fender mirror 20, electrically-controlled interior mirror 30, and push button switch 60 are the same as those of the first embodiment. In this embodiment, two more electrical devices, such as an electrically-controlled exterior front underview mirror (electrically-controlled front under mirror) 80 attached to, for example, a front portion of a box-body automobile, and an electrically-controlled exterior rear underview mirrow (electrically-controlled rear under mirror) 90 attached to a rear portion of the box-body automobile are further provided. The operation switch 10 is connected to a switching circuit 100. This switching circuit 100 has four relay switches 101, 102, 103, and 104 for connecting the operation switch 10 with the electrically-controlled fender mirror 20, interior mirror 30, front under mirror 80, and rear under mirror 90, respectively. The relay switch 101 is normally closed and thus the operation switch 10 is normally connected with the electrically-controlled fender mirror 20 in the same way as in the first embodiment.

In response to the actuation of the push button 60, a control circuit 110 produces a signal having a predetermined pulse width. This signal is applied to one of the relay switches 101, 102, 103, and 104, to close the applied relay switch. Namely, the relay switch to which the signal is applied is selected in accordance with the number of times that the push button switch 60 is actuated.

Figure 5:
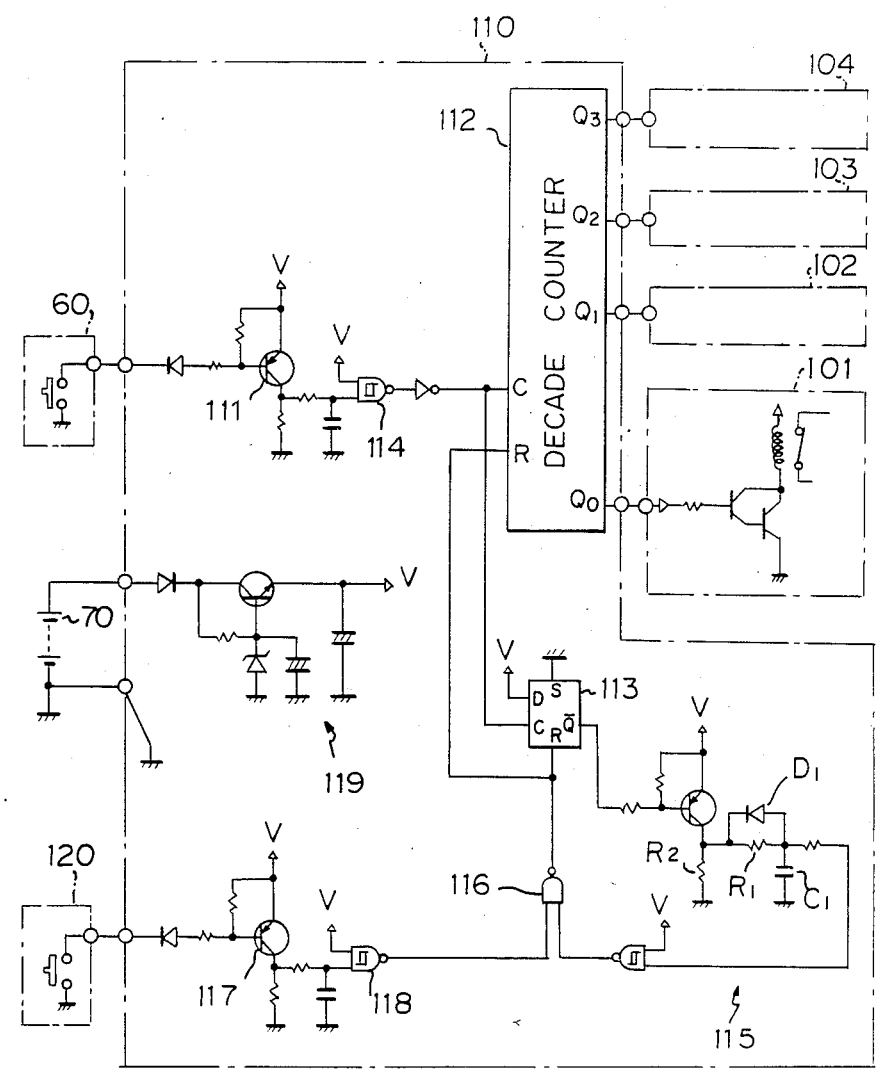
FIG. 5 is a detailed circuit wiring diagram of the embodiment of FIG. 4.

FIG. 5 illustrates a detailed circuit construction of the control circuit 110. The push button switch 60 is connected to a transistor 111 in the control circuit 110. The collector of the transistor 111 is connected to the clock terminal of a decade counter 112 and to the clock terminal of a D type flip-flop 113, via a Schmitt trigger circuit 114 and an inverter. The decade counter 112 produces a high level signal only at the $Q_0$ output terminal before receiving a clock signal. If one signal is applied to the clock terminal of the decade counter 112, a high level signal appears only at the $Q_1$ output terminal. If two signals are applied, a high level signal appears only at the $Q_2$ output terminal, and if three signals are applied, only at the $Q_3$ output terminal. Namely, depending upon the number of times the push button switch 60 is actuated, the decade counter 112 produces a high level signal at one of its output terminals. These $Q_0$, $Q_1$, $Q_2$, and $Q_3$ output terminals of the decade counter 112 are connected to the relay switches 101, 102, 103, and 104, respectively. When a high level signal is applied, each of the relay switches 101, 102, 103, and 104 turns ON.

The $\overline{Q}$ output terminal and reset terminal of the flip-flop 113 are connected to a timer circuit 115. The constitution and operation of the timer circuit 115 are the same as those of the timer circuit 54 of the first embodiment. The output of the timer circuit 115 is connected to the reset terminal of the flip-flop 113 and also to the reset terminal of the decade counter 112 via a NAND gate 116.

Another push button switch 120, used to manually reset the decade counter 112 and the flip-flop 113, is provided in this embodiment. Namely, the push button switch 120 is connected to the NAND gate 116 via a transistor 117 and a Schmitt trigger circuit 118. The driver can correct any error in the actuation of the push button switch 60 by actuating the push button switch 120, and then correctly actuating the push button switch 60 again.

A power supply circuit 119, which is the same as the power supply circuit 59 of the first embodiment, is provided in the control circuit 112.

Hereinafter, the operation of the second embodiment of FIGS. 4 and 5 will be explained.

Normally, a signal is not applied to the clock terminal of the decade counter 112 and a high level signal is produced only on the $Q_0$ output terminal of the decade counter 112, thus only the relay switch 101 is closed. Therefore, in this case, the operation switch 10 is connected to and controls the electrically-controlled fender mirror 20.

When the push button switch 60 is actuated, for example, twice, the decade counter 112 produces a high level signal only at the $Q_2$ output terminal, closing the relay switch 103 and connecting the operation switch 10 to the electrically-controlled front under mirror 80. Furthermore, since the flip-flop 113 is set, the timer circuit 115 starts the afore-mentioned timer operation. When the time period T has elapsed after the actuation of the push button switch 60, a signal is applied to the reset terminals of the flip-flop 113 and the decade counter 112 via the NAND gate 116, causing them to be reset. As a result, the signal at the $Q_2$ output terminal of the decade counter 112 is inverted to a low level and a high level signal appears at the $Q_0$ output terminal, returning the relay switch 101 to the ON state. That is, if the push button switch 60 is actuated twice, the electrically-controlled front under mirror 80 can be controlled by operating the operation switch 10 for the time period T. Where the push button switch 60 is actuated once, the relay switch 102 is closed and the electrically-controlled room mirror 30 can be controlled by the operation switch 10 for the time period T. When the push button 60 is actuated three times, the relay switch 104 is closed and the electrically-controlled rear under mirror 90 can be controlled by the operation switch 10 for the time period T. The time period T can be freely varied by changing the time constant $R_1C_1$ of the timer circuit 115.

As will be obvious from the foregoing description, a power seat, power window, and other electrical devices can be used instead of the above-mentioned mirrors.

Many widely different embodiments of the present invention may be constructed without departing from the spirit and scope of the present invention. It should be understood that the present invention is not limited to the specific embodiments described in this specification, except as defined in the appended claims.

We claim:

1. An apparatus for controlling a plurality of electrical devices, comprising:
   operation means adapted for controlling said electrical devices, said operation means controlling only one of said devices at any time;
   (a) switching means for selectively connecting said operation means to any of said electrical devices, said operation means being normally connected to one of said devices;
   means for giving instructions to instruct said connecting of said switching means; and
   means for controlling said connecting of said switching means, and for connecting said operation means with another of said electrical devices for a predetermined period of time when said instructions are given.

2. An apparatus as claimed in claim 1, further comprising two electrical devices controlled by said apparatus, and wherein said switching means includes a transfer switch means for selectively connecting said operation means with one of said two electrical devices.

3. An apparatus as claimed in claim 1, further comprising at least three electrical devices controlled by said apparatus, and wherein said switching means includes at least three relay switches connected to said electrical devices and to said operation means, one of said relay switches being selectively closed in response to said instructions.

4. An apparatus as claimed in claim 3, wherein said controlling means includes:
   timer circuit means for producing a first electrical signal when a predetermined period of time elapses after the giving of said instructions; and
   selection circuit means for selecting, in response to said instructions, another of said relay switches to connect said operation means with another of said electrical devices, said selection circuit means selecting said one of said relay switches to connected said operation means with said one of said electrical devices when said first electrical signal is produced.

5. An apparatus as claimed in claim 4, wherein said selection circuit means selects any of said relay switches depending upon the number of said instructions given.

6. An apparatus as claimed in claim 1, wherein said operation means comprises an operation switch for controlling said electrical devices.

7. An apparatus as claimed in claim 1, wherein said instruction means comprises a momentary-contact switch.

8. An apparatus as claimed in claim 11, wherein said momentary-contact switch is a push button type switch.

9. An apparatus for controlling a plurality of electrical devices, comprising:
   operation means for controlling said electrical devices;
   switching means for selectively connecting said operation means to one of said electrical devices;
   means for giving instructions to control said connecting of said switching means; and
   means for controlling said connecting of said switching means and for connecting said operation means with another of said electrical devices for a predetermined period of time when said instructions are given, including:
   (a) means for changing said connecting of said operation means from one of said electrical devices to another of said electrical devices when said instructions are given; and
   (b) means for returning said connecting of said operation means to said one of said electrical devices when a predetermined period of time elapses after giving of said instructions.

10. An apparatus as claimed in claim 9, wherein said returning means includes a timer means for signaling the expiration of a predetermined period of time after the giving of said instructions.

11. An apparatus for controlling a plurality of electrical devices, comprising:
   operation means adapted for controlling said electrical devices;
   switching means for selectively connecting said operation means to one of said electrical devices;
   said switching means including a transfer switch means for selectively connecting said operation means with one of said two electrical devices;
   means for giving instructions of control said connecting of said switching means; and
   means for controlling said connecting of said switching means and for connecting said operation means with another of said electrical devices for a predetermined period of time when said instructions are given;
   two electrical devices controlled by said apparatus;
   said controlling means including:
   (a) timer circuit means for producing a first electrical signal when a predetermined period of time elapses after the giving of said instructions; and
   (b) a flip-flop circuit which is set by said instructions to produce a second electrical signal which causes said transfer switch means to connect said operation means with another of said electrical devices, said flip-flop circuit being reset by said first electrical signal to terminate said second electrical signal, whereby said transfer switch means reconnects said operation means with said one of said electrical devices.

12. An apparatus for controlling a plurality of electrical devices, comprising:
   a single operation switch for controlling said electrical devices;

switching means for selectively connecting said operation switch with any of said electrical devices;

a momentary-contact switch; and control means connected to said momentary-contact switch for controlling said connecting of said switching means and for connecting said operation switch with another of said electrical devices for a predetermined period of time when said momentary-contact switch is actuated.

13. An apparatus for controlling a plurality of electrical devices, comprising:

operation switch means for controlling said electrical devices;

switching means for selectively connecting said operation switch means with any of said electrical devices;

a momentary-contact switch; and control means connected to said momentary-contact switch for controlling said connecting of said switching means and for connecting said operation switch means with another of said electrical devices for a predetermined period of time when said momentary-contact switch is actuated, comprising:

(a) means for changing the connection of said operation switch means from one of said electrical devices to another of said electrical devices when said momentary-contact switch is actuated; and (b) means for returning the connection of said operation switch means to said one of said electrical devices when a predetermined period of time elapses after said momentary-contact switch is actuated.

14. An apparatus for controlling a plurality of electrical actuators provided in an automobile, comprising:

an operation switch actuated by a driver, adapted to control said electrical actuators;

a momentary-contact switch adapted to be actuated by said driver;

switching means for selectively connecting said operation switch with one of said electrical actuators; and control means connected to said momentary-contact switch for controlling said connecting of said switching means and for connecting said operation switch with one of said electrical actuators normally, and connecting with another of said electrical actuators for a predetermined period of time when said momentary-contact switch is actuated.

15. An apparatus as claimed in claim 14, wherein said automobile has at least one electrically-controlled exterior rear view mirror and an electrically-controlled interior rear view mirror, and wherein said electrical actuators include at least one actuator of said electrically-controlled exterior rear view mirror and an actuator of said interior rear view mirror.

16. An apparatus for allowing a driver to control a plurality of electrical devices, comprising:

operation means adapted for allowing driver control of said electrical devices;

switching means for selectively connecting said operation means to any of said electrical devices, said operation means being normally connected to one of said devices;

means for giving instructions to instruct aaid connecting of said switching means; and means for controlling said connecting of said switching means, and for connecting said operation means with another of said electrical devices for a predetermined period of time when said instructions are given, thereby allowing driver control of said devices during said period of time.

17. An apparatus as in claim 16 wherein said operation means controls only one of said devices at any time.

* * * * *